United States Patent Office 3,391,149
Patented July 2, 1968

3,391,149
NOVEL OXAZEPINES AND THIAZEPINES AND METHOD FOR THEIR SYNTHESIS
Nelson R. Easton and Robert D. Dillard, Indianapolis, Ind., assignors to Eli Lilly and Company, Indianapolis, Ind., a corporation of Indiana
No Drawing. Continuation-in-part of application Ser. No. 305,224, Aug. 28, 1965. This application May 15, 1967, Ser. No. 638,642
2 Claims. (Cl. 260—294.8)

ABSTRACT OF THE DISCLOSURE

The synthesis of novel tetrahydro- and hexahydro-oxazepines and thiazepines is described wherein an N-($\beta$-hydroxy or $\beta$-mercaptoethyl)-$\alpha$-aminoacetylene is cyclized. In the acetylene, the acetylenic hydrogen is replaced by alkyl or alkoxyalkyl. The cyclized compounds are useful as solvents, and as intermediates. In addition, the compounds have pharmacological and anti-microbial activities as the free base or in the form of an acid addition salt.

---

This application is a continuation-in-part of application Ser. No. 305,224, filed Aug. 28, 1965, now abandoned.

Background of the invention

Morpholines and thiamorpholines are well known in the art. Morpholines containing two substituents on the carbon atom alpha to the nitrogen on the morpholine ring were first described by Easton and Dillard in U.S. Patent 3,192,208. These morpholines were prepared by cyclizing in the presence of base a 3-aminopropyne in which the carbon atom carrying the amino group was fully substituted. The resulting compound contained an exocyclic methylene group. Other prior art patents, for example U.S. Patents 3,048,598 and 3,021,341, have also indicated that ring closure on an $\alpha$-substituted alkynyl-$\beta$-hydroxyethyl ether gave rise to a dioxane, a 6-membered ring compound containing two oxygen atoms.

Summary

The invention provides tetrahydro- and hexahydrooxazepines and thiazepines represented by the following formula:

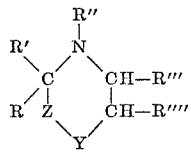

Formula I wherein R and R′ when taken individually, are $C_1$–$C_5$ alkyl, monocyclic and bicyclic aromatic or $C_3$–$C_8$ cycloalkyl; R and R′, when taken together, form a bridging alkylene group containing from 3–5 carbon atoms; R″, R‴ and R⁗ can be the same groups as specified for R and R′ and in addition can be phenyl-substituted $C_1$–$C_3$ alkyl, $C_1$–$C_5$ alkoxy-substituted $C_1$–$C_5$ alkyl and hydrogen; R‴ and R⁗, when taken together, form a bridging alkylene group with from 2–4 carbon atoms; R″ can, in addition, be a $C_3$–$C_5$ alkenyl group; Y is oxygen or sulfur; and Z is a member of the group consisting of

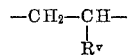

and

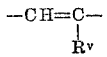

wherein $R^v$ is $C_1$–$C_5$ alkyl or $C_1$–$C_5$ alkoxy-substituted $C_1$–$C_5$ alkyl.

In defining the above groupings, $C_1$–$C_5$ alkyl includes the following groups: methyl, ethyl, isopropyl, n-propyl, n-butyl, isobutyl, sec.-butyl, t-butyl, n-amyl, isoamyl, t-amyl, 2-pentyl, 3-pentyl, 3-methyl-2-butyl, and neopentyl. The same radicals are included in defining the alkyl portion of $C_1$–$C_5$ alkoxy. Alkylene chains having from 3–5 carbon atoms which R and R′ together, or from 2–4 which R‴ and R⁗ together, can form include ethylene, trimethylene, tetramethylene and pentamethylene.

When R and R′ represent $C_3$–$C_8$ cycloalkyl radicals, they can be, illustratively, cyclobutyl, cyclopropyl, cyclohexyl, cyclopentyl, cyclooctyl, and cycloheptyl, as well as alkylated derivatives thereof.

The term "monocyclic" and "bicyclic aromatic" which R and R′ represent includes such radicals as phenyl, 2-pyridyl, 3-pyridyl, 4-pyridyl, 2-thienyl, 3-thienyl, 2-furyl, 3-furyl, 2-pyrimidyl, 4-pyrimidyl, $\alpha$-naphthyl, azulenyl, 2-pyrrolyl, 2-pyrazinyl, 3-pyrazinyl, 4-indolyl, 5-thiazolyl, 2-imidazolyl, 5-tetrazolyl, 3-pyrazolyl, 4-isoxazolyl, 4-imidazolyl, 5-quinolyl, 5-isoquinolyl, pyrimidopyridyl, pteridyl, benzoaxazolyl, 2-benzimidazolyl and benzthiazolyl. Each of the above groups is derived from an organic monocyclic or bicyclic radical which satisfies the standard criteria for aromaticity. These criteria are (1) that the ring system contain (4N+2) pi electrons and (2), in the case of bicyclic systems, that the rings are planar. These concepts of aromaticity are fully set forth in articles by Wilson Baker, Perspectives in Organic Chemistry, 1956; by Robert Breslow, On Aromatic Character, Chemistry and Engineering News, p. 90, June 28, 1965; and by Huckel in his treatise, Theoretische Grundlagen der Organischen Chemie, 2. Auflage, 1. Band, Akademische Verlagsgesellschaft m.b.H., Leipzig, 1934. In addition, the term "monocyclic" and "bicyclic aromatic" includes any of the above ring systems when substituted with a standard substituting group such as lower alkyl, lower alkoxy, amino, lower alkylamino, di-lower alkylamino, halogen, nitro, and the like. In the above substituent groups, the term "lower alkyl" is meant to include those radicals having from 1–3 carbon atoms in the alkyl chain. The term "halogen" includes all members of the seventh main group of the periodic system. In addition, any given aromatic ring can contain more than one of the above substituting groups. The following radicals will serve to illustrate substituted aromatic groups falling within the definition of the term as used herein; 2-chloro-3-furyl, 2-chloro-5-thienyl, o-tolyl, p-dimethylaminophenyl, 2-nitro-1-naphthyl, 4-amino-2-pyridyl, p-trifluoromethylphenyl, m-(di-n-propylamino)phenyl, p-anisyl, m-ethoxy-p-bromophenyl, p-iodophenyl, p-astatinylphenyl, 3-n-propoxy-2-pyridyl, p-isopropoxyphenyl, 2,4-dimethylphenyl, 3,4-methylenedioxyphenyl, 2-chloro-4-nitrophenyl, and the like. R″, R‴ and R⁗ can represent, in addition to the groups set forth for R or R′ above, phenyl-substituted $C_1$–$C_3$ alkyl. Included within this term are the benzyl, phenethyl, 2-phenyl-1-propyl, 1-phenyl-2-propyl, and the like groups. R″, in addition to representing the same groups as R or R′, can also be a $C_3$–$C_5$ alkenyl group, as for example, allyl, methallyl, crotyl, 2-pentenyl-1, 3-methyl-3-butenyl-1, 3-methyl-2-butenyl-2, 3-methyl-2-butenyl-1, and the like.

In the above formula $R^v$ can be a $C_1$–$C_5$ alkyl group or $C_1$–$C_5$ alkoxy-substituted $C_1$–$C_5$ alkyl group. The exemplification of alkyl was set forth in the definitions of R above. Illustrative groups which $R^v$ can represent thus include methyl, ethyl, butyl, isobutyl, 1-pentyl, 2- pentyl, methoxymethyl, ethoxyethyl, isopropoxy-2-pentyl, 2-n-butoxy-methylethyl, 3-ethoxypropyl and the like.

Illustrative compounds coming within the scope of the above formula include:

2,3,4,5 - tetrahydro - 4,5,5,7 - tetraethyl - 1,4 - thiazepine 2,3,4,5-tetrahydro-2,5,5-triphenyl-4-allyl-7-methyl-1,4-oxazepine 2,3,4,5 - tetrahydro - 2,7 - di - ethoxymethyl - 4 - benzyl-5-isopropyl-5-n-propyl-1,4-oxazepine 2,3,4,5 - tetrahydro - 2,3 - tetramethylene - 4 - (3 - methoxypropyl) - 5 - ethoxymethyl - 5,7 - dimethyl - 1,4 - oxazepine 2 - p - anisyl - 4 - n - amyl - 5,5 - dimethyl - 7 - sec. - butyloxyethylhexahydro-1,4-thiazepine 2 - cyclohexyl - 4 - cyclobutylmethyl - 5 - methyl - 5 - t-butyl-7-n-propyl-hexahydro-1,4-oxazepine 4 - α - phenylpropyl - 5 - methyl - 5 - cyclopentyl - 7 - cyclopentyl-methyl-hexahydro-1,4-oxazepine 2,3,4,5 - tetrahydro - 4 - allyl - 2 - cyclohexylethyl - 5 - n-amyl - 5 - ethyl - 7 - isoamyloxybutyl - 1,4 - thiazepine 3 - ethoxyethyl - 4,5,5 - trimethyl - 7 - (2 - pentyl) - hexahydro-1,4-oxazepine 2 - o - chlorophenyl - 4 - 2,4 - dichlorophenyl) - 5,5 - di-n-propyl - 7 - (4 - n - propyloxy - 1 - pentyl) - hexahydro-1,4-oxazepine The compounds of this invention wherein Z represents

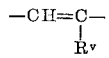

are prepared by cyclizing, under alkaline conditions, an amino-acetylene represented by the following formula:

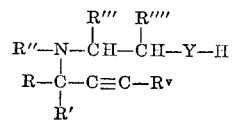

Formula II wherein R, R', R'', R''', R'''', R$^v$, and Y have the same meaning as hereinabove.

This cyclization procedure is readily carried out by heating a compound represented by Formula II above in the presence of an inert solvent such as xylene and in the presence of a strong inorganic base such as potassium hydroxide, sodium hydroxide, and the like. Since the inorganic base is usually insoluble in the reaction solvent, it is necessarily present during the reaction as a separate solid phase. The reaction is preferably carried out at a temperature in the range 130–150° C. and most conveniently at the refluxing temperature of the particular solvent employed. The cyclized compound, a tetrahydro-1,4-oxazepine or a tetrahydro-1,4-thiazepine, is isolated by separating the inorganic base as by filtration or, alternatively, by extraction into water from the organic layer, and then fractionally distilling the filtrate, the oxazepine or thiazepine being recovered as a high-boiling fraction.

It is wholly surprising that amino-acetylenes represented by Formula II above cyclize to yield a 1,4-oxazepine or 1,4-thiazepine having a 7-membered ring instead of the expected 6-membered morpholine or thiomorpholine ring system which is produced from structures similar to the amino-acetylenes represented by Formula II above but in which R$^v$ is hydrogen, according to U.S. Patent 3,192,208. It would not be expected that mere substitution of an alkyl group for the hydrogen of the acetylenic function would cause the reaction to proceed in a different fashion to yield a 7-membered ring. Furthermore, according to U.S. Patents 3,048,598 and 3,021,341, ring closure of an α-substituted alkynyl-β-hydroxyethyl ether gives rise to a methylene-dioxane or a 2-substituted 2-dioxene even when the hydrogen of the alkynyl group is substituted with an alkyl or aryl group. These alkynyl - β - hydroxyethyl ethers are oxygen analogues of applicants' amines and it would not be expected that substitution of an oxygen function by nitrogen would cause the ring closure reaction to follow a different course in forming a 7-membered ring as in the instant invention.

The compounds of this invention represented by Formula I,

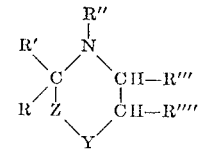

wherein Z is

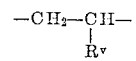

are called hexahydro-1,4-oxazepines or hexahydro-1,4-thiazepines. They are prepared by hydrogenating the corresponding tetrahydro-1,4 - oxazepine or tetrahydro - 1,4-thiazepine produced by cyclizing the amino-acetylenes of Formula II. The usual conditions for hydrogenating the tetrahydro-1,4-oxazepines or thiazepines comprise the use of an inert solvent, low-pressure hydrogen, and a noble-metal catalyst. Among the noble metals which can be employed are included: platinum, palladium, rhodium, and the like. Since the double bond of the tetrahydro-1,4-oxazepine or tetrahydro-1,4-thiazepine is readily hydrogenated, it is not necessary to use a catalyst of extremely high activity, and we have found it most convenient to employ a deposited heavy-metal catalyst, specifically palladium-on-carbon, for this purpose. Among the inert diluents which we employ for the hydrogenation reaction may be mentioned ethanol, methanol, ethyl acetate, and the like.

Also included within the scope of this invention are the acid addition salts of the hexahydro-1,4-oxazepines and hexahydro-1,4-thiazepines represented by Formula I above when

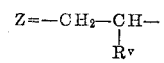

While the hexahydro-1,4-oxazepine and thiazepine free bases are heavy viscous oils, the corresponding acid addition salts are white crystalline solids readily prepared in pure form. These acid addition salts are useful in isolating and purifying the hexahydro-1,4-oxazepines and hexahydro-1,4-thiazepines of this invention.

Among the acids which form acid addition salts with the fully hydrogenated free bases of this invention are included inorganic acids such as sulfuric, phosphoric, phosphorous, nitric, nitrous, hydrochloric, hydrobromic, hydriodic, pyrophosphoric, and the like acids, as well as organic acids such as succinic, maleic, acetic, butyric, tartaric, hemimellitic, benzoic, naphthoic, phthalic, toluenesulfonic, and the like acids.

The preparation of acid addition salts of the hexahydro-1,4-oxazepines and hexahydro-1,4-thiazepines of this invention can be carried out as follows: A solution of the hexahydro free base is mixed with an equivalent of an acid, either as such or in solution. If the acid addition salt thus formed is insoluble in the solvent or solvents employed, it precipitates and is isolated by filtration or centrifugation. On the other hand, if the acid addition salt is soluble in the solvent employed, the acid addition salt is recovered in solid form by evaporation of the solvent. When an acid addition salt is formed with a gaseous acid, such as hydrogen chloride, an excess of the acid can be employed since the excess can be readily removed by volatilization.

The preparation of a typical acid addition salt, specifically a hydrochloride salt, is carried out as follows: A solution of the hexahydro-1,4-oxazepine or thiazepine is prepared in anhydrous ether and an ethereal solution of hydrogen chloride is added thereto, the hydrogen chloride being in a quantity in excess of that needed to react with the number of equivalents of amine present. The hexahydro-1,4-oxazepine or thiazepine hydrochloride is, in general, isoluble in the ethereal solution and is separated by filtration. The acid addition salt is satisfactorily purified by recrystallization from a mixture of anhydrous ethanol and ethyl acetate, although other solvents and solvent mixtures are equally operative.

This invention is further illustrated by the following specific examples:

Example 1.—2,3,4,5-tetrahydro-4,5,5,7-tetramethyl-1,4-oxazepine

Forty-six and five tenths grams of N-methyl-N-(2-hydroxyethyl) 4-amino-4-methyl-2-pentyne were added in dropwise fashion to a dispersion of 15 g. of coarsely ground 90 percent potassium hydroxide in 300 ml. of refluxing xylene. The reaction mixture was heated at refluxing temperature for about three hours and was then cooled and the cooled solution filtered to remove potassium hydroxide. The filtrate was then distilled. 2,3,4,5-tetrahydro-4,5,5,7-tetramethyl-1,4-oxazepine formed in the above reaction boiled in the range 80–90° C./20 mm. Hg. Redistillation of this fraction yielded 2,3,4,5-tetrahydro-4,5,5,7-tetramethyl-1,4-oxazepine boiling at about 52° C./6 mm. Hg; $n_D^{25}=1.469$.

Example 2.—4,5,5,7-tetramethylhexahydro-1,4-oxazepine

Twelve grams of 2,3,4,5-tetrahydro-4,5,5,7-tetramethyl-1,4-oxazepine were dissolved in 200 ml. of ethanol. The solution was placed in a low-pressure hydrogenation apparatus and the oxazepine was hydrogenated at a hydrogen pressure of about 40 p.s.i. over a palladium-on-carbon catalyst. After the theoretical quantity of hydrogen had been absorbed, the catalyst was removed by filtration and an excess of gaseous hydrogen chloride was bubbled into the filtrate. The fitrate was concentrated to dryness in vacuo leaving 4,5,5,7-tetramethylhexahydro-1,4-oxazepine hydrochloride as a residue. The residue was dissolved in water and the aqueous solution was made basic with 40 percent sodium hydroxide, thus forming 4,5,5,7-tetramethylhexahydro-1,4-oxazepine free base. The free base was extracted into ether. The ether extracts were separated and dried. The ether was removed by evaporation in vacuo and the residue, comprising 4,5,5,7-tetramethylhexahydro-1,4-oxazepine, was purified by distillation. The compound boiled at about 72.5° C./20 mm. Hg.

*Analysis.*—Calc.: C, 68.78; H, 12.17. Found: C, 68.86; H, 12.29; $n_D^{25}=1.449$.

Example 3.—2,3,4,5,tetrahydro-4,7-dimethyl-5,5-pentamethylene-1,4-oxazepine

Following the procedure of Example 1, N-methyl-N-(2-hydroxyethyl) - 1-amino-1-(1-propynyl)cyclohexane was cyclized in xylene solution in the presence of potassium hydroxide to yield 2,3,4,5-tetrahydro-4,7-dimethyl-5,5-pentamethylene-1,4-oxazepine which distilled at about 55° C./0.04 mm. Hg.

*Analysis.*—Calc.: C, 73.79; H, 10.83. Found: C. 73.94; H, 10.96.

Following the procedure of Example 2, 2,3,4,5-tetrahydro-4,7-dimethyl-5,5-pentamethylene-1,4-oxazepine was hydrogenated over a palladium-on-carbon catalyst to yield 4,7-dimethyl-5,5-pentamethylenehexahydro - 1,4 - oxazepine which distilled at about 56–57° C./0.06 mm. Hg.

*Analysis.*—Calc.: C, 73.04; H, 11.75. Found: C, 72.84; H, 11.86.

The corresponding hydrochloride salt was prepared by dissolving the free base in methyl ethyl ketone, and saturating the resulting solution with anhydrous gaseous hydrogen chloride. 4,7-dimethyl-5,5-pentamethylenehexahydro-1,4-oxazepine hydrochloride melted at about 203–205° C. after recrystallization from ethyl acetate.

*Analysis.*—Calc.: C, 61.65; H, 10.34. Found: C, 61.83; H, 10.53.

The following compounds can be prepared by the above procedure by utilizing as starting material an acetylenic amine derived originally from a cyclo-alkanone: 2,3,4,5-tetrahydro - 4,7-diethyl-5,5-tetramethylene-1,4-oxazepine and 4-methyl-7-ethyl - 5,5 - trimethylenehexahydro-1,4-oxazepine.

Example 4.—2,3,4,5-tetrahydro-2-phenyl-4,5,5,7-tetramethyl-1,4-oxazepine

Following the procedure of Example 1, N-methyl-N-(2-hydroxy-2-phenylethyl) 4-amino-4-methyl-2-pentyne was cyclized in xylene solution in the presence of potassium hydroxide to yield 2,3,4,5-tetrahydro-2-phenyl-4,5,5,7-tetramethyl-1,4-oxazepine which distilled at about 76–77° C./0.04 mm. Hg.

*Analysis.*—Calc.: C, 77.88; H, 9.15. Found C, 77.91; H, 9.41.

Following the procedure of Example 2, 2,3,4,5-tetrahydro-2-phenyl-4,5,5,7-tetramethyl-1,4-oxazepine was hydrogenated in ethanol solution over a palladium-on-carbon catalyst to yield 2-phenyl-4,5,5,7-tetramethylhexahydro-1,4-oxazepine which distilled at about 82° C./0.08 mm. Hg.

*Analysis.*—Calc.: C, 77.20; H, 9.93. Found: C, 77.22; H, 10.04. The corresponding hydrochloride salt was prepared by the method of Example 3 and melted at about 153–155° C. after recrystallization from ethyl acetate.

*Analysis.*—Calc.: C, 66.77; H, 8.96. Found: C, 66.94; H, 9.01.

The above procedures can be employed to prepare the following compounds: 2,3,4,5-tetrahydro-2-(3-thienyl)-4,5,5,7-tetramethyl-1,4-oxazepine, 2-(4-pyridyl)-4,5,5,7-tetraethylhexahydro-1,4-oxazepine 2,3,4,5-tetrahydro - 2-(5 - thiazolyl)-4-allyl-5,5,7-trimethyl-1,4-oxazepine, 2-(2-pyrimidyl) - 4,7 - diethyl-5,5-dimethylhexahydro-1,4-oxazepine, 2,3,4,5-tetrahydro-2-(8-quinolinyl)-4,5,5,7-tetramethyl-1,4-oxazepine, 2-(α-naphthyl)-4,5,5,7-tetramethylhexahydro-1,4-oxazepine, 2 - azulenyl-4,5,5,7-tetramethylhexahydro-1,4-oxazepine, 2-benzimidazolyl-4-cyclohexyl-5,5,7-trimethylhexahydro-1,4-oxazepine.

Example 5.—2,3,4,5-tetrahydro-4-ethyl-5,7-dimethyl-5-phenyl-1,4-oxazepine

Following the procedure of Example 1, N-ethyl-N-(2-hydroxyethyl)-4-amino-4-phenyl-2-pentyne was cyclized in xylene solution in the presence of potassium hydroxide to yield 2,3,4,5-tetrahydro-4-ethyl-5,7-dimethyl-5-phenyl-1,4-oxazepine which distilled in the range 76–77° C./0.01 mm. Hg; $n_D^{25}=1.534$.

*Analysis.*—Calc.: C, 77.87; H, 9.14. Found: C, 77.91; H, 9.25

Following the procedure of Example 2, 2,3,4,5-tetrahydro-4-ethyl-5,7-dimethyl-5-phenyl-1,4 - oxazepine was hydrogenated in ethanol solution over a palladium-on-carbon catalyst to yield 4-ethyl-5,7-dimethyl-5-phenyl-hexahydro-1,4-oxazepine which distilled in the range 75–76° C./0.01 mm. Hg.

The above procedure can be used to prepare the following compounds from available starting materials: 2,3,4,5 - tetrahydro-4-benzyl - 5,5-diphenyl-7-methyl-1,4-oxazepine, 2,3,4,5-tetrahydro-4-n-propyl-5,5-di-(2-thienyl)-7-ethyl - 1,4-oxazepine, 4,7-dimethyl-5-cyclopentyl-5-(4-pyridyl) - hexahydro-1,4-oxazepine, 4-cyclopropyl-5,7-dimethyl-5 - (4-pyrimidyl) - hexahydro - 1,4-oxazepine, 4,5,7-trimethyl-5 - (β-naphthyl)-hexahydro-1,4-oxazepine, 4-phenethyl-5,7-dimethyl-5 - (3-tolyl) - hexahydro-1,4-oxazepine, 4 - phenethyl - 5,7 - dimethyl-5 - (3,4-dioxymethylenephenyl) - hexahydro - 1,4 - oxazepine, 4-phenethyl-5,7-dimethyl-5-(4-dimethylaminophenyl) - hexahydro-1,4 - oxazepine, 4-phenethyl-5,7 - dimethyl-5 - (2,4-dinitrophenyl)-hexahydro-1,4-oxazepine, and 4-(2-phenylpropyl)-5,7-dimethyl-5-(4-chloro - 2-pyridyl)-hexahydro-1,4-oxazepine.

Example 6—2,3,4,5-tetrahydro-4-phenethyl-5,5,7-trimethyl-1,4-oxazepine

Following the procedure of Example 1, N-phenethyl-N - (2-hydroxyethyl) 4 - amino-4-methyl-2-pentyne was cyclized in xylene solution in the presence of powdered potassium hydroxide to yield 2,3,4,5-tetrahydro-4-phenethyl-5,5,7-trimethyl-1,4-oxazepine which boiled at about 84–85° C./0.01 mm. Hg.

*Analysis*—Calc.: C, 78.32; H, 9.44. Found: C, 78.56; H, 9.54.

Following the procedure of Example 2, 2,3,4,5-tetrahydro-4-phenethyl-5,5,7-trimethyl-1,4-oxazepine was hydrogenated in ethanol solution over a palladium-on-carbon catalyst to yield 4-phenethyl-5,5,7-trimethylhexahydro-1,4-oxazepine, which boiled at about 79.5° C./0.01 mm. Hg.

*Analysis*—Calc.: C, 77.68; H, 10.18. Found: C, 77.93; H, 10.31.

Example 7—2,3,4,5-tetrahydro-2,4,5,5,7-pentamethyl-4-oxazepine

Following the procedure of Example 1, N-methyl-N-(2-hydroxypropyl-4-amino-4-methyl-2-pentyne was cyclized in xylene solution in the presence of potassium hydroxide to yield 2,3,4,5-tetrahydro-2,4,5,5,7-pentamethyl-1,4-oxazepine which distilled at about 50° C./4 mm. Hg; $n_D^{25}=1.461$.

*Analysis*—Calc.: C, 70.95; H, 11.31. Found: C, 70.94; H, 11.60.

Following the procedure of Example 2, 2,3,4,5-tetrahydro-2,4,5,5,7-pentamethyl-1,4 - oxazepine was hydrogenated over a palladium-on-carbon catalyst to yield 2,4,5,5,7-pentamethylhexahydro-1,4 - oxazepine. The compound boiled at about 49° C./4 mm. Hg; $n_D^{25}=1.445$. The corresponding hydrochloride salt was made by the procedure of Example 3 and melted at about 163–165° C. after recrystallization from methyl ethyl ketone.

*Analysis*—Calc.: C, 57,81; H, 10.67. Found: C, 57,98; H, 10.67.

Example 8—2,3,4,5-tetrahydro-5,5,7-trimethyl-1,4-oxazepine

Following the procedure of Example 1, 4-(2-hydroxyethylamino)-4-methyl-2-pentyne was cyclized in xylene solution in the presence of potassium hydroxide to yield 2,3,4,5-tetrahydro-5,5,7-trimethyl - 1,4-oxazepine which distilled at about 51° C./6 mm. Hg; $n_D^{25}=1.467$.

*Analysis*—Calc.: C, 68.04; H, 10.70. Found: C, 67.97; H, 10.64.

Following the procedure of Example 2, 5,5,7-trimethyl-2,3,4,5-tetrahydro-1,4-oxazepine was hydrogenated in ethanol solution using palladium-on-carbon as a cattlyst to yield 5,5,7-trimethylhexahydro-1,4-oxazepine. The compound was purified by distillation and boiled at about 50° C./6 mm. Hg.

*Analysis*—Calc.: C, 67.08; H, 11.96. Found: C, 67.28; H, 12.08.

The corresponding hydrochloride salt was made by the method of Example 3 and melted at about 124–126° C. after recrystallization from ethyl acetate.

*Analysis*—Calc.: C, 53.47; H, 10.09. Found: C, 53.52; H, 10.14.

Example 9—2,3,4,5-tetrahydro-4,5,5,-trimethyl-7-ethyl-1,4-oxazepine

Following the procedure of Example 1, N-methyl-N-(2-hydroxyethyl) - 2-amino-2-methyl - 3-hexyne was cyclized in xylene solution in the presence of potassium hydroxide to yield 2,3,4,5-tetrahydro-4,5,5-trimethyl-7-ethyl-1,4-oxazepine which distilled at about 59° C./4 mm. Hg; $n_D^{25}=1.467$.

*Analysis*—Calc.: C, 70.95; H, 11.31, Found: C, 71.11; H, 11.46.

Following the procedure of Example 2, 2,3,4,5-tetrahydro-4,5,5-trimethyl-7-ethyl-1,4-oxazepine was hydrogenated in ethanol solution using a palladium-on-carbon catalyst to yield 4,5,5-trimethyl-7-ethylhexahydro-1,4-oxazepine which distilled in the range 58–59° C./4 mm. Hg.

The corresponding hydrochloride salt was made by the procedure of Example 3 and melted at about 117–119° C. after recrystallization from ethyl acetate.

*Analysis*—Calc.: C, 57.81; H, 10.67. Found: C, 57.66; H, 10.64.

Example 10—2,3,4,5-tetrahydro-3,4,5,5,7-pentamethyl-1,4-oxazepine

Following the procedure of Example 1, N-methyl-N-(2-hydroxy-1-methylethyl) 4-amino-4-methyl-2-pentyne was cyclized in xylene solution in the presence of potassium hydroxide to yield 2,3,4,5-tetrahydro-3,4,5,5,7-pentamethyl-1,4-oxazepine which distilled at about 55° C./4 mm. Hg; $n_D^{25}=1.468$.

*Analysis*—Calc.:—C, 70.95; H, 11.31. Found: C, 71.08; H, 11.48.

Following the procedure of Example 2, 2,3,4,5-tetrahydro-3,4,5,5,7-pentamethyl - 1,4 - oxazepine was hydrogenated in ethanol solution using a palladium-on-carbon catalyst to yield 3,4,5,5,7-pentamethylhexahydro-1,4-oxazepine. The compound distilled at about 56° C./4 mm. Hg; $n_D^{25}=1.449$.

*Analysis*—Calc.: C, 70.12; H, 12.35. Found: C, 69.94; H, 12.41.

The following compounds can be prepared by the above procedure using suitable starting materials: 2,3,4,5-tetrahydro-3,4,5,5,7-pentaethyl-1,4-oxazepine, 2,3,4,5-tetrahydro-2,3,4,5,5,7-hexamethyl-1,4-oxazepine 3-(n-pentyl)-4-cyclobutyl-5,5,7-trimethylhexahydro-1,4 - oxazepine, 3-isopropyl-4-(3-pentyl)-5,5,7-tri - (n-propyl)-hexahydro-1,4-oxazepine.

Example 11—2,3,4,5-tetrahydro-2-phenyl-5,5,7-trimethyl-1,4-oxazepine

Following the procedure of Example 1, 4-(2-hydroxy-2-phenylethylamino)-4-methyl-2-pentyne was cyclized in xylene solution in the presence of potassium hydroxide to yield 2,3,4,5-tetrahydro-2-phenyl-5,5,7-trimethyl-1,4-oxazepine which distilled in the range 77–79° C/0.02 mm. Hg.

*Analysis*—Calc.: C, 77.38; H, 8.81. Found: C, 77.52; H, 8.92.

Following the procedure of Example 2, 2,3,4,5-tetrahydro-2-phenyl-5,5,7-trimethyl-1,4-oxazepine was hydrogenated in ethanol solution using a palladium-on-carbon catalyst to yield 2-phenyl-5,5,7-trimethylhexahydro-1,4-oxazepine which distilled in the range 77–80° C./0.01 mm. Hg. The distillate was crystallized from hexane and melted at about 112–115° C.

*Analysis*—Calc.: C, 76.66; H, 9.65. Found: C, 76.63; H, 9.93.

2,3,4,5 - tetrahydro - 2 - p - chlorophenyl - 5,5,7 - trimethyl-1,4-oxazepine was prepared in the same manner from the corresponding amino-acetylene. The compound distilled in the range 101–103° C./0.03 mm. Hg.

*Analysis*.—Calc.: C, 66.79; H, 7.20. Found: C, 66.94; H, 7.39. The corresponding hexahydro derivative was also prepared and melted at about 159–163° C. after recrystallization from a benzene-pentane mixture.

Example 12.—2,3,4,5-tetrahydro-4,5,5-trimethyl-7-methoxymethyl-1,4-oxazepine Following the procedure of Example 1, N-methyl-N-(2 - hydroxyethyl) - 4 - amino - 4 - methyl - 1 - methoxy-2-pentyne was cyclized in xylene solution in the presence of potassium hydroxide to yield 2,3,4,5-tetrahydro-4,5,5-trimethyl-7-methoxymethyl-1,4-oxazepine which distilled in the range 83–87° C./4 mm. Hg Redistillation of this fraction through a spinning band fractionating column yielded purified 2,3,4,5 - tetrahydro - 4,5,5 - trimethyl-7-methoxymethyl-1,4-oxazepine boiling in the range 83–85° C./4 mm. Hg.

*Analysis.*—Calc.: C, 64.83; H, 10.39. Found: C, 64.69; H, 10.47.

Following the procedure of Example 2, 2,3,4,5-tetrahydro - 4,5,5 - trimethyl - 7 - methoxymethyl - 1,4-oxazepine was hydrogenated in ethanol solution using a palladium-on-carbon catalyst to yield 4,5,5-trimethyl-7-methoxymethylhexahydro-1,4-oxazepine which distilled at about 79° C./4 mm. Hg.

*Analysis.*—Calc.: C, 69.13; H, 11.30. Found: C, 69.37; H, 11.59.

The following compounds can be prepared following the above procedure:

2,3,4,5-tetrahydro-5,5-dimethyl-7-ethoxyethyl-1,4-oxazepine,
2,3,4,5-tetrahydro-2-(4-isoxazolyl)-4-methallyl-5,5-dimethyl-7-(3-methoxypropyl)-1,4-oxazepine,
3-(8-quinolinyl)-4-benzyl-5,5-dimethyl-7-(4-methoxy-3-methyl-2-butyl)-hexahydro-1,4-oxazepine,
3-(3-imidazolyl-4-5,5-di-n-propyl-7-n-pentyloxymethyl-hexahydro-1,4-oxazepine,
4,5-di-(2-methylbutyl)-5-methyl-7-ethoxy-n-propyl-hexahydro-1,4-oxazepine,
2,4-dimethyl-4-cyclohexyl-5-benzyl-1-oxa-5-aza-bicyclo [5·0·4] undecane,
2-ethyl-4,4-diisobutyl-5-cyclooctyl-1-oxa-5-aza-bicyclo [5·0·3] decane.

Example 13.—2,3,4,5-tetrahydro-4,5,5,7-tetramethyl-1,4-thiazepine

Forty-one grams of N-methyl-N-(2-mercaptoethyl) 4-amino-4-methyl-2-pentyne were added in dropwise fashion to 500 ml. of refluxing xylene containing 20 g. of powdered potassium hydroxide. After the addition had been completed, the reaction mixture was refluxed for another three hours and was then cooled, and the cooled reaction mixture was washed with water. The organic layer was separated and dried and the dried solution distilled. 2,3,4,5 - tetrahydro - 4,5,5,7 - tetramethyl - 1,4-thiazepine boiled in the range 77–78° C./4 mm. Hg; $n_D^{25}=1.521$.

*Analysis.*—Calc.: C, 63.10; H, 10.00. Found: C, 63.23; H, 10.16.

The above compound can be reduced using a large excess of platinum catalyst to yield 4,5,5,7-tetramethyl-hexahydro-1,4-thiazepine which can be isolated as such or in the form of an acid addition salt, for example, a hydrochloride salt.

Example 14.—2,3,4,5-tetrahydro-4,5,5,7-tetramethyl-3-phenyl-1,4-oxazepine

Following the procedure of Example 1, N-methyl-N-(2 - hydroxy - 1 - phenylethyl) - 4 - amino - 4 - methyl-2-pentyne was cyclized in xylene solution in the presence of powdered potassium hydroxide to yield 2,3,4,5-tetrahydro - 4,5,5,7 - tetramethyl - 3 - phenyl - 1,4 - oxazepine which distilled at about 80.4° C./0.05 mm. Hg.

*Analysis.*—Calc.: C, 77.88; H, 9.15; N, 6.05. Found: C, 77.72; H, 9.20; N, 6.13.

The compound is readily hydrogenated by the procedure of Example 2 to yield 3-phenyl-4,5,5,7-tetramethyl-hexahydro-1,4-oxazepine.

The above procedure can be employed to prepare the following compounds utilizing suitable starting materials:

3-(3-pyridazinyl)-4,5,5,7-tetramethylhexahydro-1,4-oxazepine,
3-(3-bromo-2-thienyl)-4,5,5,7-tetramethylhexahydro-1,4-oxazepine,
3-(4-ethoxyphenyl)-4,5,5,7-tetramethylhexahydro-1,4-oxazepine,
3-(3-methoxy-2-pyridyl)-4,5,5,7-tetramethylhexahydro-1,4-oxazepine,
3-(5-methyl-3-pyridyl)-4,5,5,7-tetramethylhexahydro-1,4-oxazepine,
3-(5-benzthiazolyl)-4,5,5,7-tetramethylhexahydro-1,4-oxazepine,
3-(3,4-dimethyl-5-pyrazolyl)-4,5,5,7-tetramethyl-hexahydro-1,4-oxazepine.

Example 15.—2,3,4,5-tetrahydro-4-phenyl-5,5,7-trimethyl-1,4-oxazepine

Following the procedure of Example 1, N-phenyl-N-(2 - hydroxyethyl) - 4 - amino - 4 - methyl - 2 - pentyne was cyclized in xylene solution in the presence of powdered potassium hydroxide to yield 2,3,4,5-tetrahydro - 4 - phenyl - 5,5,7 - trimethyl - 1,4 - oxazepine which distilled at about 115–118° C./4 mm. Hg.

*Analysis.*—Calc.: C, 77.38; H, 8.81; N, 6.45. Found: C, 77.66; H, 8.63; N, 6.43.

The following compounds can be prepared from the above procedure from the corresponding starting materials:

2,3,4,5-tetrahydro-4-(2-pentyl)-5,5,7-trimethyl-1,4-oxazepine,
2,3,4,5-tetrahydro-4-(4-dimethylaminophenyl)-5,5,7-trimethyl-1,4-oxazepine,
2,3,4,5-tetrahydro-4-(2-nitrophenyl)-5,5,7-trimethyl-1,4-oxazepine,
2,3,4,5-tetrahydro-4-(4-trifluoromethylphenyl)-5,5,7-trimethyl-1,4-oxazepine,
2,3,4,5-tetrahydro-4-(4-pyrimidinyl)-5,5,7-trimethyl-1,4-oxazepine, and
2,3,4,5-tetrahydro-4-(4-fluorophenyl)-5,5,7-trimethyl-1,4-oxazepine.

Example 16.—2,3,4,5-tetrahydro-5,5,7-trimethyl-2-(α-naphthyl)-1,4-oxazepine

Following the procedure of Example 1, N-[2-(α-naphthyl) - 2 - hydroxyethyl] - 4 - amino - 4 - methyl-2-pentyne was cyclized in xylene solution in the presence of powdered potassium hydroxide. The crude reaction mixture was distilled and the fraction boiling in the range 150–175° C./0.2 mm. Hg was collected. This fraction was chromatographed over florisil using a 4:1 benzene-ethylacetate solvent mixture as eluant. The major eluate fraction contained purified 2,3,4,5-tetrahydro-5,5,7-trimethyl-2-(α-naphthyl)-1,4-oxazepine.

*Analysis.*—Calc.: C, 80.86; H, 7.92; N, 5.25. Found: C, 80.84; H, 8.17; N, 5.16.

Hydrogenation of the above product by the method of Example 2 using palladium-on-charcoal yielded 5,5,7-trimethyl-2-(α-naphthyl)-hexahydro-1,4-oxazepine.

The following compounds can be prepared by the above procedure from the corresponding starting materials:

5,5,7-trimethyl-2-(β-naphthyl)-hexahydro-1,4-oxazepine,
5,5,7-trimethyl-2-(4-quinolinyl)-hexahydro-1,4-oxazepine,
5,5,7-trimethyl-2-(5-isoquinolinyl)-hexahydro-1,4-oxazepine,
5,5,7-trimethyl-2-(4-benzimidazolyl)-hexahydro-1,4-oxazepine,
5,5,7-trimethyl-2-(2-pyrrolyl)-hexahydro-1,4-oxazepine and
5,5,7-trimethyl-2-(2-pyrazinyl)-hexahydro-1,4-oxazepine.

Example 17.—2,3,4,5-tetrahydro-4,5,5,7-tetramethyl-2-benzyl-1,4,-oxazepine

Following the procedure of Example 1, N-methyl-N-(2-hydroxy - 3 - phenylpropyl)-4-amino-4-methyl-2-pentyne was cyclized in xylene in the presence of powdered potassium hydroxide to yield 2,3,4,5-tetrahydro-4,5,5,7-tetramethyl-2-benzyl-1,4,-oxazepine which distilled in the range 88–98° C./0.3 mm. Hg.

*Analysis.*—Calc.: C, 78.32; H, 9.45; N, 5.71. Found: C, 78.39; H, 9.63; N, 5.97.

N - methyl - N - (2-hydroxy-3-phenylpropyl)-4-amino-4-methyl-2-pentyne, the starting material in the above reaction, was prepared by the reaction of 3-phenyl-1,2-propylene oxide and 4-methylamino-4-methyl-2-pentyne. The compound boiled in the range 96–101° C./0.05 mm. Hg.

The following compounds can be prepared by the above procedure from the corresponding starting materials: 2,3,4,5-tetrahydro-4,5,5,7-tetramethyl-2-phenethyl-1,4-oxazepine, 2,3,4,5-tetrahydro-4,5,5,7-tetramethyl-2-(2-phenyl - 1 - propyl) - 1,4 - oxazepine, 2,3,4,5,-tetrahydro-4,5,5,7 - tetramethyl - 2 - (3 - phenyl - 2-propyl)-1,4-oxazepine, and 2,3,4,5 - tetrahydro - 4,5,5,7-tetramethyl-2-(1-phenylethyl)-1,4,-oxazepine.

Example 18.—2,3,4,5-tetrahydro-4,5,5,7-tetramethyl-2-(4-methyl-3-pyridyl)-1,4-oxazepine Twelve grams of 2-methyl-5-vinylpyridine were dissolved in 50 ml. of ethanol and 500 ml. of water. 21.5 g. of n-bromosuccinimide were added. The reaction mixture was stirred for about 3 hours and then extracted with ether. The ether extract was separated, washed with water and dried and the ether removed therefrom by evaporation in vacuo. The resulting residue was added to 200 ml. of 20 percent sodium hydroxide. The alkaline mixture was stirred for 3 hours and then extracted with ether. The ether extract was separated and the ether removed by evaporation in vacuo. The residue was mixed with 25 ml. of 4-methylamino-4- methyl-2-pentyne in 250 ml. of acetonitrile and the mixture heated to refluxing temperature over night. An excess of 20 percent of aqueous sodium hydroxide was then added and the resulting mixture extracted with ether. The ether extract was separated and dried. Distillation of the ethereal solution yielded N-methyl - N - [2-(4-methyl-3-pyridyl)-2-hydroxyethyl]-4-amino-4-methyl-2-pentyne. The product was cyclized by the procedure of Example 1 to yield 2,3,4,5-tetrahydro-4,5,5,7 - tetramethyl - 2 - (4-methyl-3-pyridyl)-1,4-oxazepine, distilling in the range 105–110° C./0.05 mm. Hg.

Analysis.—Calc.: N, 11.37. Found: N, 11.05.

Example 19.—2,3,4,5-tetrahydro-4,5,5,7-tetramethyl-2-(2-thienyl)-1,4-oxazepine

One hundred grams of 2-acetylthiophene was brominated in methylene dichloride solution with 41.6 ml. of bromine. After the reaction was completed, the methylene dichloride solution was washed successively with water, a saturated sodium bicarbonate solution and again with water. The methylene dichloride solution was dried and the methylene dichloride then removed therefrom by evaporation in vacuo. The resulting residue, comprising ω-bromo-2-acetylthiophene, was dissolved in 500 ml. of acetonitrile. Two hundred and twenty-two grams of 4-methylamino-4-methyl-2-pentyne were added, and the mixture heated to refluxing temperature overnight. The reaction mixture was then cooled and washed with 10 percent aqueous sodium hydroxide. The amine product was extracted from the resulting mixture with ether. The ether extract was separated and dried and the ether removed therefrom by evaporation in vacuo. The resulting residue was dissolved in 500 ml. of methanol. Forty grams of sodium borohydride were added and the reaction mixture stirred for two hours. The reaction mixture was then diluted with water and the desired product, N-methyl-N-[2 - (2 - thienyl) - 2 - hydroxyethyl]-4-amino-4-methyl-2-pentyne, was extracted with ether. The ether extract was separated and dried and the ether removed by evaporation in vacuo. The product thus formed was cyclized by the procedure of Example 1 to yield 2,3,4,5-tetrahydro-4,5,5,7-tetramethyl-2-(2-thienyl)-1,4-oxazepine distilling in the range 87–96° C./0.05 mm. Hg.

Example 20.—2,3,4,5-tetrahydro-4,5,5,7-tetramethyl-2-(4-chlorophenyl)-1,4-oxazepine Following the procedure of Example 19, 4-chloroacetophenone was brominated in methylene dichloride solution to yield ω - bromo - 4 - chloroacetophenone, reduction of which with sodium bromohydride gave 2 - (4 - chlorophenyl)-2-hydroxyethylbromide. This compound was in turn reacted with 4-methylamino-2-methyl-2-pentyne in acetonitrile to yield N-methyl-N-[2-(4-chlorophenyl)-2-hydroxyethyl] - 4 - amino - 4-methyl-2-pentyne, melting at about 106–108° C.

Following the procedure of Example 1, the above amine was cyclized in xylene solution containing powdered potassium hydroxide to yield 2,3,4,5-tetrahydro-4,5,5,7-tetramethyl-2-(4-chlorophenyl)-1,4-oxazepine which melted at about 108–110° C. after recrystallization from methylcyclohexane.

Analysis.—Calc.: C, 67.79; H, 7.58; N, 5.27. Found: C, 67.50; H, 7.52; N, 5.26.

The above reaction sequence was carried out using 4-methylacetophenone as a starting material instead of 4-chloroacetophenone. The ultimate product of the reaction was 2,3,4,5,-tetrahydro-4,5,5,7-tetramethyl-2(4-tolyl)-1,4-oxazepine which distilled in the range 107–112° C./0.1 mm. Hg.

Analysis.—Calc.: C, 78.32; H, 9.45; N, 6.52. Found: C, 78.55; H, 9.63; N, 6.65.

Reduction of this product by the procedure of Example 2 yielded 4,5,5,7 - tetramethyl - 2-(4-tolyl)hexahydro-1,4-oxazepine, distilling in the range 98–101° C./0.1 mm. Hg.

Analysis.—Calc.: C, 77.68; H, 10.19; N, 5.66. Found: C, 77.58; H, 10.47; N, 5.96.

The same reaction sequence was used to prepare 2,3,4,5-tetrahydro - 4,5,5,7 - tetramethyl - 2-(3-anisyl)-1,4-oxazepine by using 3-methoxyacetophenone as a starting material in place of 4-chloroacetophenone. The oxazepine distilled at about 117° C./0.07 mm. Hg. Hydrogenation of the tetrahydro derivative by the procedure of Example 2 yielded 4,5,5,7-tetramethyl-2-(3-anisyl)-hexahydro-1,4-oxazepine, distilling in the range 120–125° C./0.2 mm. Hg.

Analysis.—Calc.: C, 72.96; H, 9.57; N, 5.32. Found: C, 72.88; H, 9.60; N, 5.52.

The novel tetrahydro-1,4-oxazepines and tetrahydro-1,4-thiazepines of this invention are, as previously stated, prepared by cyclizing a 2-hydroxyethylamino-acetylene or a 2-mercapto-ethylamino-acetylene as represented by Formula II above. These latter compounds are readily prepared by procedures disclosed either in the co-pending applications of Nelson R. Easton and George F. Hennion, Ser. No. 305,205, filed Aug. 28, 1963, now matured to U.S. Patent No. 3,337,625, in U.S. Patent 3,285,913, or in the co-pending application of Nelson R. Easton and Robert D. Dillard, Ser. No. 604,616, filed Dec. 27, 1966. More specifically, the starting materials which are useful in the synthesis of tetrahydro-1,4-oxazepines and thiazepines are prepared by synthesizing a compound represented by the following formula:

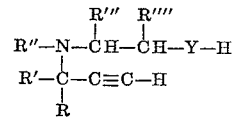

Formula III wherein R, R', R'', R''', R'''' and Y have the same meaning as hereinabove, by either reacting a primary or secondary aminoacetylene with a suitably substituted oxirane or a 2-mercaptoethyl carbonate or by reacting a halo-acetylene with a suitably substituted hydroxyethylamine or by reducing an amino-acetylene containing a carbonyl group β to the amine group with a metal-hydride reducing agent or by replacing the hydroxy group in one of the above hydroxy derivatives with a mercapto group or by other variations or combinations of these methods, the choice of particular method employed being guided by the nature of the substituents present in the acetylenic portion of the molecule. The R$^V$ grouping is then introduced into the molecule represented by Formula III above by alkylation procedures well known to the art to yield compounds corresponding to Formula II above. According to these procedures, the acetylenic hydrogen is replaced by an active metal such as sodium and the resulting salt is then reacted with an alkyl.

In the synthesis of certain of the compounds represented by Formula II above, the alkylation of the acetylenic grouping can be carried out prior to the reaction of the amino-acetylene with an oxirane or prior to the reduction of the β-carbonyl amine, but in no case can the $R^v$ group be placed in the molecule prior to the formation of the amino-acetylene itself.

The following will illustrate the preparation of certain typical starting materials represented by Formula II above.

PROCEDURE 1

One hundred and eleven grams of 4-methylamino-4-methyl-2-pentyne and 69.6 g. of propylene oxide were dissolved in 100 ml. of methanol, and the resulting solution was warmed to about 60° C. with stirring for about four hours. Distillation of the reaction mixture yielded N-methyl-N-(2-hydroxypropyl) 4-amino-4-methyl-2-pentyne boiling at about 70° C./4 mm. Hg; $n_D^{25}$=1.460.

PROCEDURE 2

One hundred and twenty grams of styrene oxide were added to 97 g. of 4-methyl-4-amino-2-pentyne in 1000 ml. of methanol in dropwise fashion. The reaction mixture was stirred at ambient room temperature for three hours and then at about 60° C. for three hours. The methanol and excess styrene oxide were removed by evaporation in vacuo leaving as a residue 4-(2-hydroxy-2-phenylethylamino)-4-methyl-2-pentyne which was recrystallized from pentane.

4 - (2-hydroxy-2-p-chlorophenylethylamino)-4-methyl-2-pentyne was prepared in similar fashion but employing p-chlorostyrene oxide in place of styrene oxide.

PROCEDURE 3

Sixty grams of 2-mercapto diethylcarbonate were added in dropwise fashion to 133.1 g. of 4-methylamino-4-methyl-2-pentyne in 500 ml. of refluxing toluene. The reaction mixture was refluxed overnight and was then distilled. N-methyl-N-(2-mercaptoethyl)-4-amino-4-methyl-2-pentyle thus prepared distilled in the range 76.5–77° C./4 mm. Hg; $n_D^{25}$=1.501.

*Analysis.*—Calcd.: C, 63.10; H, 10.00. Found: C, 63.39; H, 10.13.

The corresponding hydrochloride salt melted in the range 148–151° C.

PROCEDURE 4

A reaction mixture was prepared containing 121.5 g. of ethyl α-bromophenylacetate and 111 g. of 4-methylamino-4-methyl-2-pentyne in 500 ml. of acetonitrile. The mixture was heated to refluxing temperature for 3 days, after which time the solvents were removed by evaporation in vacuo. The residue containing ethyl N-methyl-N-(2-methyl-3-pentynyl-2)-α-aminophenylacetate formed in the above reaction was dissolved in dichloromethane. The methylene dichloride solution was contacted with dilute aqueous hydrochloric acid, thus extracting the amine product. The acid aqueous solution was made basic with dilute sodium hydroxide and the base-insoluble amine extracted with dichloromethane. The organic extract was separated and dried. Distillation of the resulting solution yielded ethyl N-methyl-N-(2-methyl-3-pentynyl-2)-α-aminophenylacetate boiling in the range 100–110° C./0.1 mm. Hg.

54.5 grams of the above ester were reduced with 20 g. of lithium aluminum hydride in 1 liter of anhydrous ether. The product was isolated and purified by standard procedures. N - methyl - N-(2-hydroxy-1-phenylethyl)-4-amino-4-methyl-2-pentyne, thus prepared, distilled in the range 92–95° C./0.1 mm. Hg.

PROCEDURE 5

A reaction mixture was prepared from 80 g. of 3-phenylamino-3-methyl-1-butyne and 26.4 g. of ethylene oxide in 150 ml. of methanol, and heated for 16 hours in an autoclave. Distillation of the reaction mixture yielded N-phenyl-N-(2-hydroxyethyl)-3-amino-3-methyl-1-butyne distilling in the range 125° C./mm. Hg. The dihydropyranyl ether of the above amine was prepared by dissolving the hydroxyamine in methanol, bubbling in anhydrous gaseous hydrogen chloride until the solution was acidic, removing the solvent in vacuo, dissolving the residue in chloroform and then adding dihydropyran dropwise to the chloroform solution. Distillation of the product yielded the desired dihydropyranylether distilling in the range 113–120° C./0.08 mm. Hg.

Sodamide was prepared by adding 7.6 g. of sodium to 1 liter of liquid ammonia. Eighty-four grams of the dihydropyranyl ether of N-phenyl-N-(2-hydroxyethyl)-3-amino-3-methyl-1-butyne dissolved in about 85 ml. of ether was added dropwise. The resulting mixture was stirred for about 30 minutes, after which time 47 g. of methyl iodide were added in dropwise fashion. This reaction mixture was stirred for about 2 hours and then washed with water. The ether layer was extracted with dilute aqueous hydrochloric acid, thus carrying the amine into the aqueous layer. The acidic aqueous solution was stirred overnight in order to decompose the dihydropyranyl ether. The reaction mixture was then made basic with sodium hydroxide and the free amine, N-phenyl-N-(2-hydroxyethyl)-4-amino-4-methyl-2-pentyne produced in the above reaction was extracted with ether. Distillation of the dried ether extract yielded N-phenyl-N-(2-hydroxyethyl)-4-amino-4-methyl-2-pentyne, distilling in the range 134–136° C./4 mm. Hg.

The compounds of this invention are useful as solvents and as intermediates in chemical reactions. In addition, many of them show pharmacological activity. More specifically, the hexahydro-1,4-oxazepines and hexahydro-1,4-thiazepines can be used as solvents in alkali metal hydride reduction processes. The tetrahydro-1,4-oxazepines and tetrahydro-1,4-thiazepines are useful as chemical intermediates in the production of the corresponding hexahydro derivatives.

The pharmacological activity of the compounds of this invention manifests itself chiefly as an effect upon the central nervous system; for example, in preventing electroshock or metrazole-induced convulsions in rats and in lowering the blood pressure of hypertensive rats. In addition, certain of the compounds have shown an anti-androstane effect in rats. In addition, the compounds have anti-microbial activity, particularly 2,3,4,5-tetrahydro-5,5,7-trimethyl-2-(α-naphthyl)-1,4-oxazepine which effective against various soil pathogens.

In general, the compounds in addition to the utility set forth above also have many of the activities shown in the past by the morpholines and thiomorpholines to which they are related. Among these utilities are included the ability of the compounds to form salts with fluosilicic acid. The salts are useful as moth proofing agents according to U.S. Patents 1,915,334 and 2,075,359. The compounds are also useful in preventing acidic corrosion. In addition, compounds in which Z in Formula I is

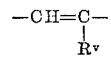

are requisite intermediates for the preparation of compounds according to Formula I in which Z is

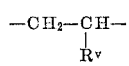

While there have been described various embodiments of the invention, the methods and elements described are not intended to be understood as limiting the scope of the invention, as it is realized that changes therewithin are possible, and it is further intended that each element recited in any of the following claims is to be understood as referring to all equivalent elements for accomplishing substantially the same results in substantially the same or equivalent manner or producing substantially the same structures, it being intended to cover the invention broadly in whatever form its principle may be utilized.

We claim:

1. The process of preparing a compound represented by the formula:

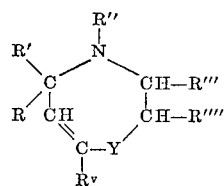

wherein R and R' when taken individually, are $C_1$-$C_5$ alkyl, monocyclic or bicyclic aromatic or $C_3$-$C_8$ cycloalkyl; R and R' when taken together, form a bridging alkylene group containing from 3–5 carbon atoms; R" is phenyl-substituted $C_1$-$C_3$ alkyl, $C_1$-$C_5$ alkoxy-substituted $C_1$-$C_5$ alkyl, hydrogen, $C_3$-$C_5$ alkenyl or one of the groups defining R and R'; R''' and R'''', when taken individually, are phenyl-substituted $C_1$-$C_3$ alkyl, $C_1$-$C_5$ alkoxy-substituted $C_1$-$C_5$ alkyl hydrogen or one of the groups defining R and R'; R''' and R'''', when taken together, form a bridging alkylene group with from 2–4 carbon atoms; Y is oxygen or sulfur; and $R^v$ is $C_1$-$C_5$ alkyl or $C_1$-$C_5$ alkoxy-substituted $C_1$-$C_5$ alkyl;

which comprises heating in the presence of an inert diluent and of an inorganic base, a compound represented by the following formula:

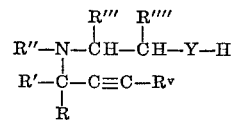

wherein R, R', R'', R''', R'''', $R^v$ and Y have the same meaning as hereinabove.

2. A compound represented by the formula:

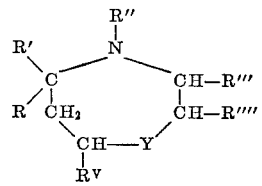

wherein R and R', when taken individually, are $C_1$-$C_5$ alkyl, phenyl or $C_3$-$C_8$ cycloalkyl; R and R', when taken together with the carbon atom to which they are attached, form a bridging alkylene group containing from 3–5 carbon atoms; R" is $C_1$-$C_5$ alkyl, phenyl, $C_3$-$C_8$ cycloalkyl, phenyl-substituted $C_1$-$C_5$ alkyl, $C_1$-$C_5$ alkoxy-substituted $C_1$-$C_5$ alkyl, hydrogen or $C_3$-$C_5$ alkenyl; R''' and R'''', when taken individually, are $C_1$-$C_5$ alkyl, phenyl, chlorophenyl, tolyl, anisyl, α-naphthyl, pyridyl, methylpyridyl, thienyl, $C_3$-$C_8$ cycloalkyl, phenyl-substituted $C_1$-$C_3$ alkyl, $C_1$-$C_5$ alkoxy-substituted $C_1$-$C_5$ alkyl or hydrogen; R''' and R'''', when taken together, form a bridging alkylene group containing from 2–4 carbon atoms; $R^v$ is $C_1$-$C_5$ alkyl or $C_1$-$C_5$ alkoxy-substituted $C_1$-$C_5$ alkyl; and Y is oxygen or sulfur.

References Cited

Mushkalo et al. chem. abstracts, vol. 55 (1961), p. 563.

JAMES A. PATTEN, Primary Examiner.